United States Patent [19]
Ernst

[11] Patent Number: 5,470,124
[45] Date of Patent: Nov. 28, 1995

[54] RAIL STRUCTURE FOR CANOPY INSTALLATION ON A TRUCK BOX

[76] Inventor: Gregory R. Ernst, 15735 SE. Bartell Rd., Boring, Oreg. 97009

[21] Appl. No.: 265,955

[22] Filed: Jun. 27, 1994

[51] Int. Cl.⁶ .................................................. B60P 7/02
[52] U.S. Cl. .................................................. 296/100; 296/164
[58] Field of Search .................... 296/3, 10, 35.3, 296/100, 156, 164, 165, 167; 135/88.01, 88.05, 88.09; 410/90

[56] References Cited

U.S. PATENT DOCUMENTS

| | | | |
|---|---|---|---|
| 1,008,713 | 11/1911 | Grace | 296/35.3 |
| 3,773,380 | 11/1973 | Stockdill | 296/137 |
| 3,897,100 | 7/1975 | Gardner | 296/10 |
| 3,901,548 | 8/1975 | Seaman, Jr. | 296/100 |
| 4,199,188 | 4/1980 | Albrecht et al. | 296/100 |
| 4,648,649 | 3/1987 | Beal | 296/156 |
| 4,693,508 | 9/1987 | Pettit | 296/100 |
| 4,789,197 | 12/1988 | Lewis | 296/100 |
| 4,810,158 | 3/1989 | Bitzer | 414/498 |
| 5,052,739 | 10/1991 | Irwin | 296/100 X |
| 5,305,774 | 4/1994 | Hager | 296/100 X |

*Primary Examiner*—Dean Kramer
*Attorney, Agent, or Firm*—James D. Givnan, Jr.

[57] ABSTRACT

A set of rails are in place atop the sidewalls of a truck box. Slides, one each in place on the sides of a truck canopy, engage the rails and include a flange for inserted engagement with an undercut portion of each rail. A flange free forward segment of each slide facilitates initial slide-to-rail engagement. Loading brackets, temporarily attachable to each rail, facilitate one man loading of the canopy while skids support the canopy rearward end. Teeth on the brackets and the slides prevent canopy slippage during loading. Canopy hold downs on the rails are engaged by a hold down member on each slide. Tie down hooks are carried in the crosswise slots of each rail and are locked in place by a canopy mounted slide or, alternatively by an insert in place in a rail when the canopy is removed.

10 Claims, 4 Drawing Sheets

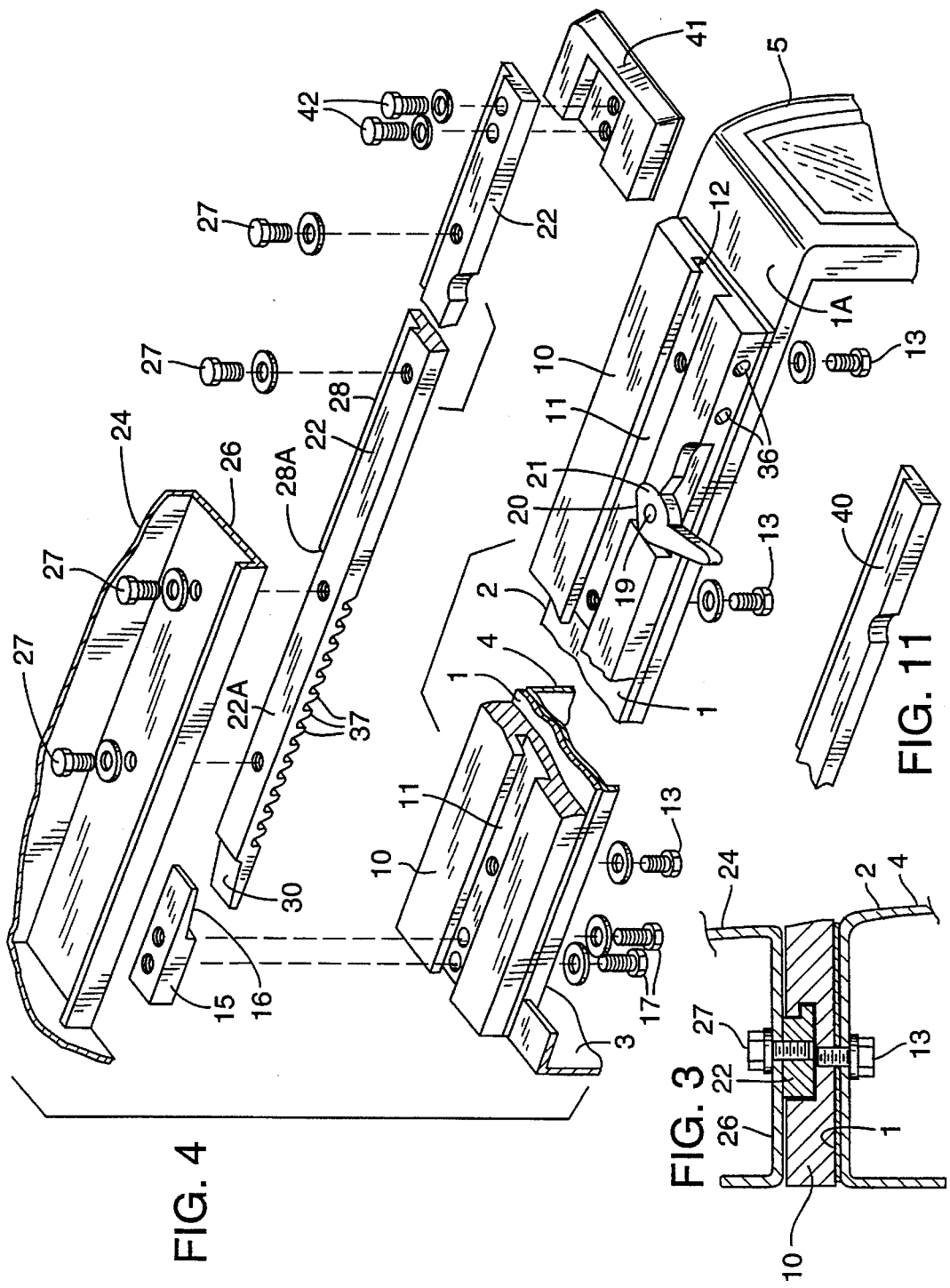

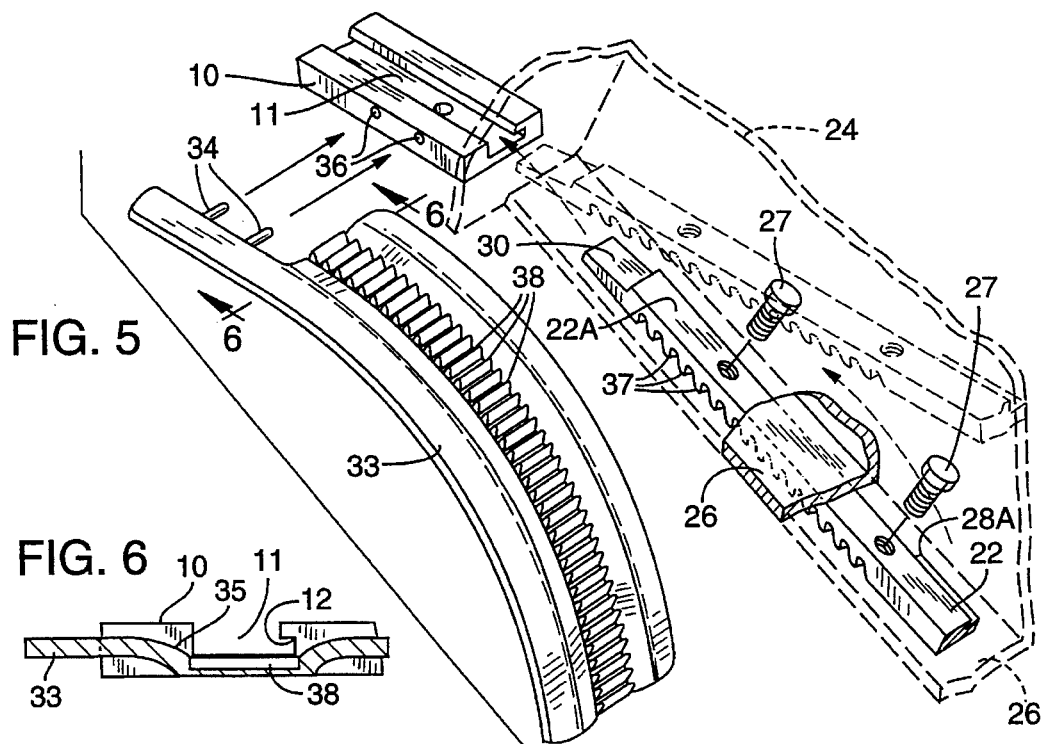
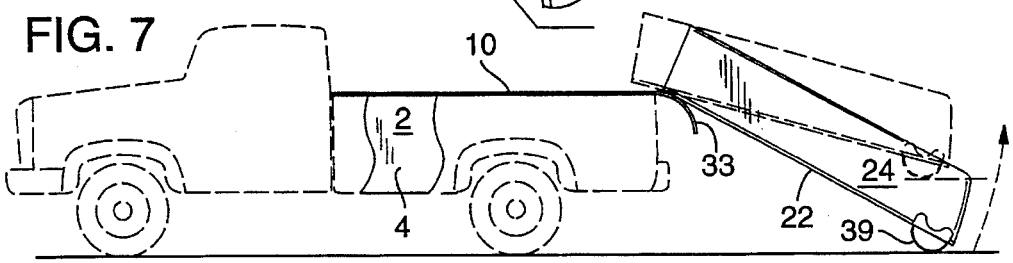
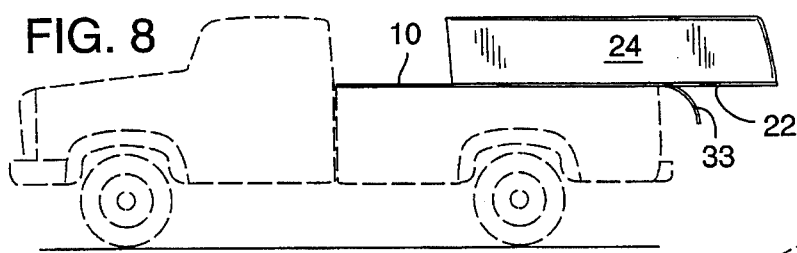
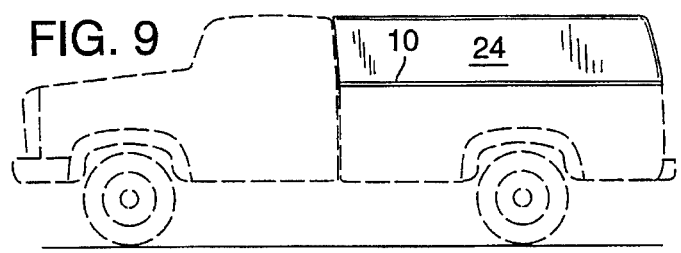
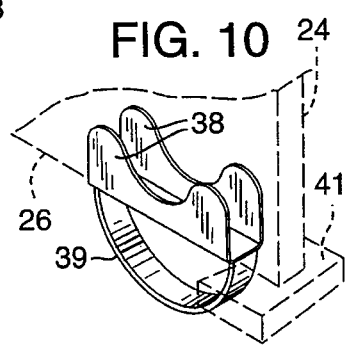

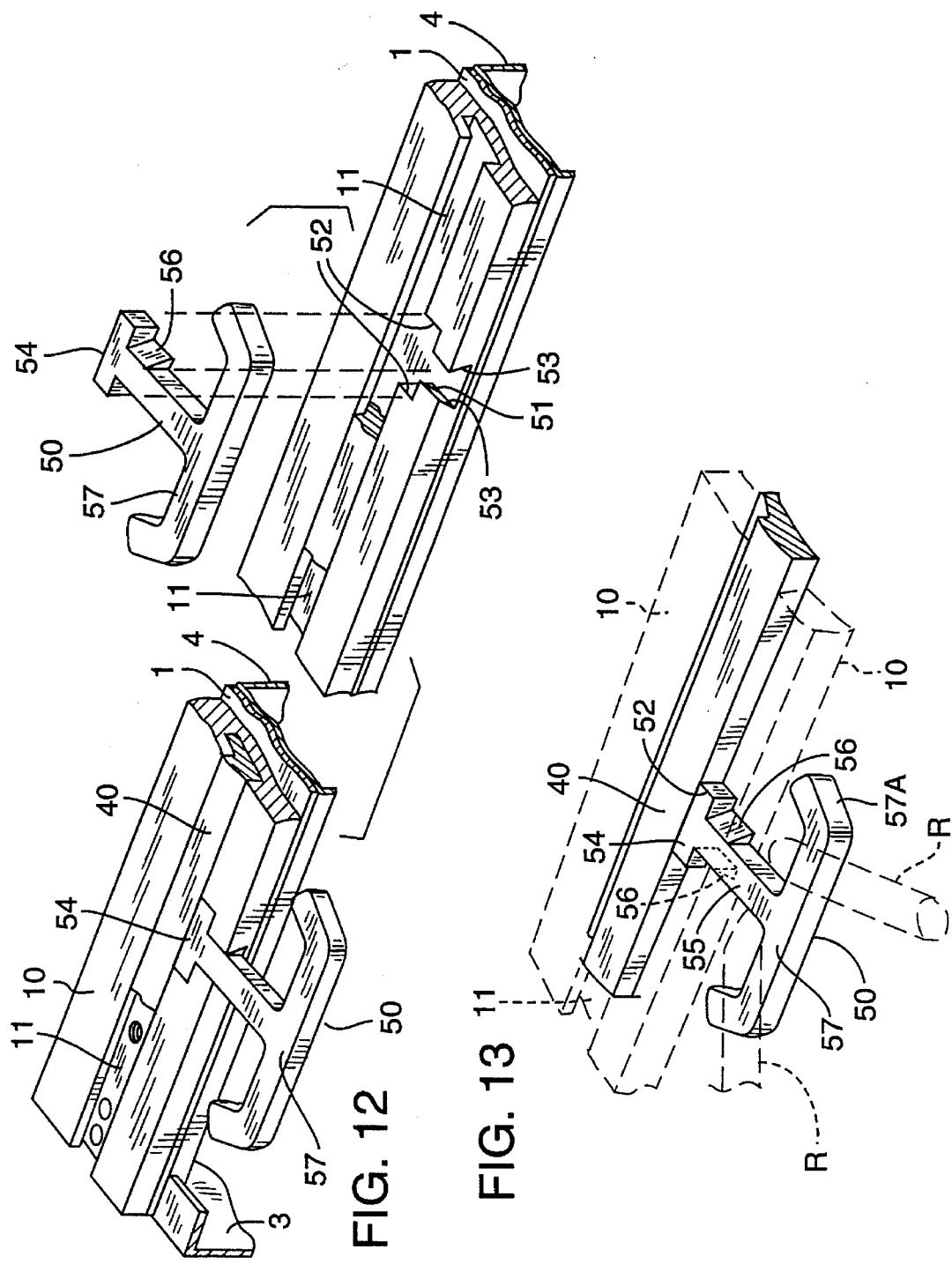

RAIL STRUCTURE FOR CANOPY INSTALLATION ON A TRUCK BOX

BACKGROUND OF THE INVENTION

The present invention pertains generally to rail structure facilitating the installation of a canopy on the sidewalls of a pickup truck box.

Commonly enclosures or canopies, as they are termed in the trade, are, for the most part, attached to the sidewalls of a pickup truck box in a permanent manner. In those instances where a high load is to be transported it is necessary to remove the canopy from the truck sidewalls, which entails considerable effort and incurs the risk of damage to the canopy or truck sidewall box surfaces as well as any weather seal in place therebetween. Previous efforts are disclosed in the following noted U.S. patents to accomplish canopy installation by the use of cooperating rails on the truck box sidewalls and the canopy. However, prior art fails to disclose a highly practical arrangement for canopy installation and removal by one person and which avoids rail alignment problems encountered by known canopy/truck box rail arrangements.

U.S. Pat. No. 4,648,649 discloses the provision of cooperating sidewall and canopy mounted rails comprising various cross-sectional configurations for canopy retention and requiring careful, precise alignment of the interengageable rail ends during canopy installation. The rails disclosed are of uniform cross-sectional shape throughout their length. U.S. Pat. No. 3,901,548 discloses a set of rails for canopy attachment which include oppositely disposed channels with their interleaved flanges occupying channel defined spaces. U.S. Pat. No. 3,773,380 discloses a canopy attaching rail arrangement wherein the canopy is provided with an inverted C-chaped rail that engages the underside of a cooperating T-shaped rail on the truck sidewall. U.S. Pat. No. 3,897,100 discloses a canopy having roller equipped tracks for rolling engagement with rails affixed to the box sidewalls. U.S. Pat. No. 4,810,158 discloses a pickup truck canopy comprising wheel elements at its four corners to facilitate placement of the canopy on the box sidewalls. The wheel means are removable from the canopy upon installation being completed. Attachment of the wheel means facilitates positioning of the canopy preparatory to placement of the canopy onto the truck box.

SUMMARY OF THE PRESENT INVENTION

In the present rail structure, the uppermost surfaces of the truck box sidewalls are equipped with rails each defining a lengthwise channel shaped to receive a slide carried by a canopy. The canopy attached slide is of a cross-section to allow being deposited downwardly into the sidewall mounted rail to avoid tedious rail alignment efforts during canopy installation. A hold down arrangement at corresponding forward ends of the engaged rails and slides confines the canopy against upward displacement. Rail locking means prevents rearward ends of the sidewall mounted rails to facilitate alignment of the canopy mounted slides during canopy installation which may be achieved by one person. Such brackets receive the forward end of the canopy mounted slides in rested engagement on the brackets and support the canopy during lifting of same and subsequent engagement of the slides with the truck box mounted rails. Such loading brackets preferably include series of teeth which hold the canopy mounted slides in place during lifting and alignment of the canopy rails with the truck box mounted rails. A plate on each canopy mounted slide abuts an end of a box mounted rail to prevent forward displacement of the canopy from its desired location. A decorative insert of strip configuration may be installed in the box mounted rail along with tie down hooks.

Important objectives of the present rail structure include the provision of rails in place on a pickup truck box sidewalls and slides on the lower overlying extremities of the canopy, which slides may be engaged initially by vertical tipping movement of the canopy mounted slide downwardly into place within the channel of the box mounted rail for subsequent lengthwise movement of the canopy mounted slides to effect full engagement with the rails; the provision of hold down means at the forward ends of rails and the engagement of a slide carried flange with an overlying portion of a truck box mounted rail; the provision of rail structures for mounting a canopy to the sidewalls of a truck box with temporarily installed loading brackets attachable to each box mounted rail to support the forward portion of the canopy during aligning and initial engagement of the rails and slides; the provision of a rail structure for mounting a canopy to the sidewalls of a pickup truck box wherein the rearward end of the canopy is in rested engagement with a pair of skids which enable canopy travel over a ground surface and which separate upon lifting of the canopy; the provision of rail and slide structure in place on the sides of a canopy and sidewalls of a pickup truck box which permits initial rail engagement to be greatly simplified to avoid tedious alignment during canopy installation as well as binding occurring between stationary and fixed rail members during installation.

BRIEF DESCRIPTION OF THE DRAWINGS

In the drawings:

FIG. 3 is a vertical sectional view taken along line 3—3 of FIG. 2.

FIG. 4 is a fragmentary exploded view of a sidewall mounted rail with a canopy mounted slide removed therefrom;

FIG. 5 is a perspective view of a loading bracket removed from a sidewall mounted rail and with a canopy and slide fragment thereon positioned for engagement with the rail;

FIG. 6 is a vertical sectional view taken-along line 6—6 of FIG. 5;

FIGS. 7, 8 and 9 are side elevational views of a pickup truck showing stages of a canopy loading operation;

FIG. 10 is a perspective view of a canopy attached slide with a canopy fragment shown in phantom lines;

FIG. 11 is a fragmentary perspective view of an insert for a rail when a canopy is removed from the rail;

FIG. 12 is a perspective view of a rail fragment equipped with tie down hooks; and FIG. 13 is a perspective view of a tie down hook in place in a rail fragment.

DETAILED DESCRIPTION OF THE PREFERRED EMBODIMENTS

Figure 1:
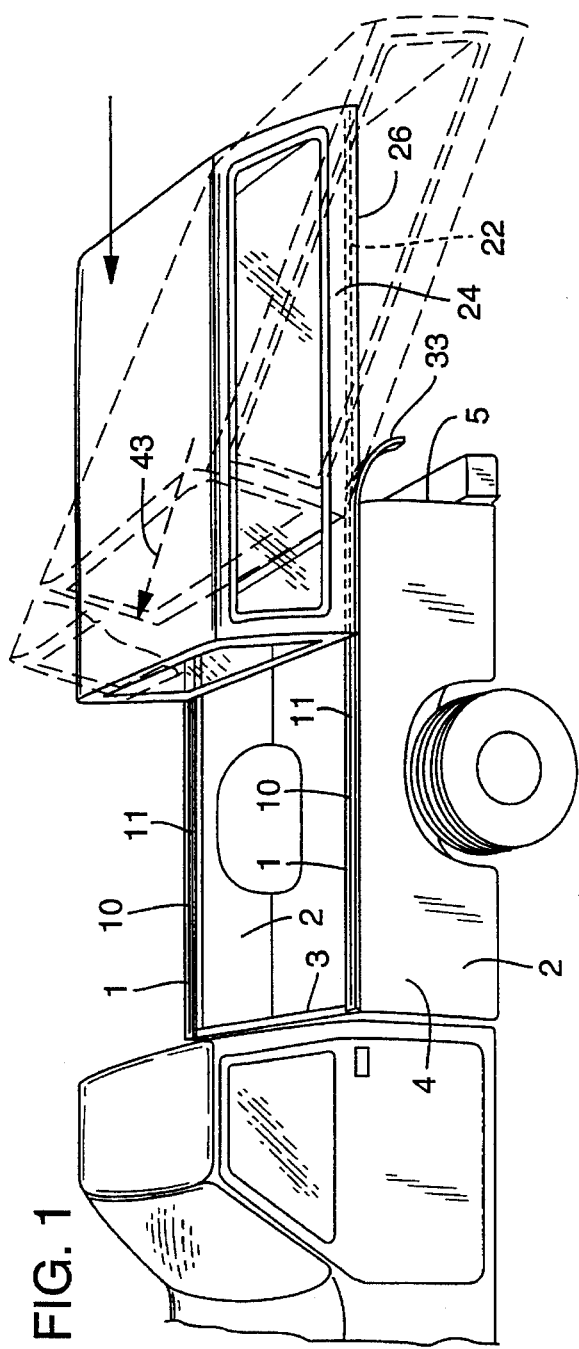
FIG. 1 is a perspective view of a pickup truck with a canopy attached thereto utilizing the present invention.
Figure 2:
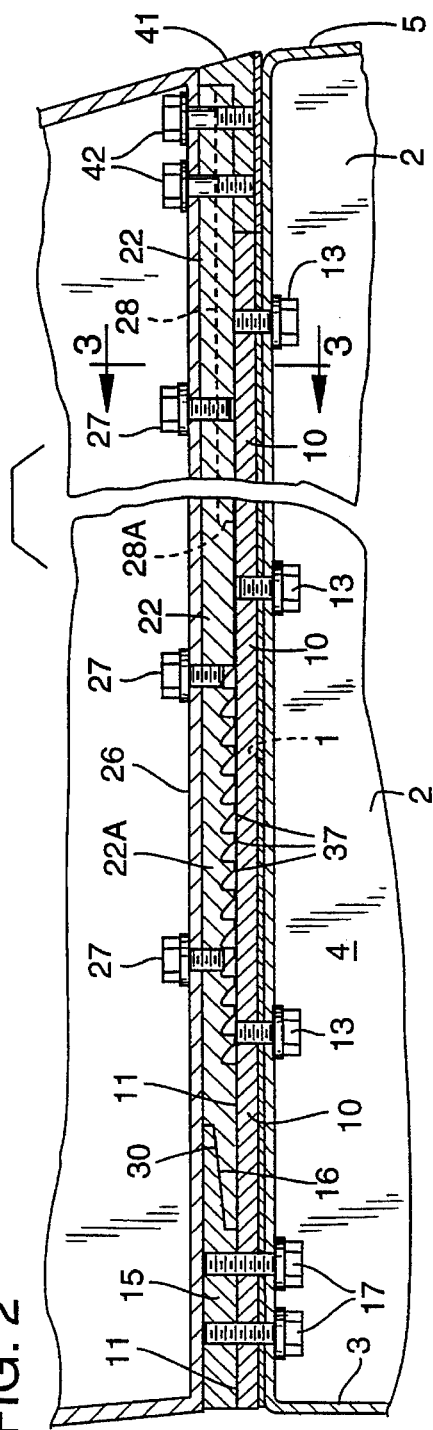
FIG. 2 is a vertical sectional view of a truck sidewall mounted rail occupied by a slide carried by the truck canopy.

With continuing attention to the drawings wherein applied reference numerals indicate parts similarly hereinafter identified, the reference numeral 1 indicates the uppermost surface of a pickup truck sidewall 2. A front wall 3 extends intermediate the forward ends of the truck box sidewall 2. The exterior of the sidewall is at 4, while the rearward end of the sidewall is at 5.

With attention to the present invention, a box mounted rail 10 extends substantially the length of uppermost box surface 1 and defines a lengthwise extending channel 11. A laterally directed undercut portion 12 of the channel extends at least partially the length of the channel. Fasteners at 13 are engageable upwardly with the underside of rail 10.

At the forward end of each rail 10 there is a hold down member 15 which includes an inclined surface 16 engageable with a later described hold down component associated with a canopy attached slide. Hold down 15 is of elongate shape to seat in channel 11 with fasteners at 17 confining the hold down in place. Locking means 20 may be embodied in an eccentric shaped cam 21 swingable about a pivot 19 for biasing contact with canopy mounted slide 22. Inward displacement of lock 20 biases the slide laterally into frictional engagement with rail 10 to prevent inadvertent as well as intentional movement of the slide and a canopy 24 to prevent canopy theft with lock being accessible only from the interior of the truck box.

Slide 22 is secured in place to the base 26 of a canopy wall 24 in a lengthwise manner by suitable fasteners 27. A laterally directed lip or flange 28 is on a rearward segment of slide 22 is offset below the lowermost surface 26 of the canopy and is received within the undercut portion 12 of rail 10. A flangeless forward segment 22A of slide 22 is unencumbered i.e., without flange 28 or other appendage so as to permit downward insertion of a forward slide segment 22A into channel 11 during canopy installation to slideably support the canopy frontal portion while installer(s) manipulates the canopy to align lip or flange 28 of the rearward flange segment with the undercut open area 12 of the wall mounted rail. Accordingly, damage to the rail 10 and slide 22 is avoided during canopy installation, as at all times during such installation the leading end 28A of flange 28 avoids being a fulcrum about which cantilevered weight of the canopy may act. The forward end of slide 22 is provided with hold down means shown as an inclined surface 30 for sliding engagement with inclined surface 16 of hold down 15. Accordingly, engagement of hold down 15 with slide 22 occurs automatically upon positioning of the canopy to its forwardmost position.

To render canopy installation and removal convenient, support means are provided in the form of loading brackets, one of which is indicated at 33, are provided. The mounting bracket shown in FIG. 5 is typical of both mounting brackets with the bracket attachable to a remaining rail 10 being a mirror image to that shown and described. Loading bracket 33 is provided with mounting pins 34 insertable within bores 36 formed in rail 10. The mounting bracket provides a rearward extension of rail 10 for rested placement on an upper exposed surface 1A of the truck sidewall and, during canopy installation by one person, bears loads imparted by the forward end of the canopy. The depending curved portion of the mounting bracket 33 serves to receive the rested forward end segment 22A of slide 22 both during canopy installation as well as removal, and is shaped so as to define a lengthwise groove 35 to guide forward end 22A of the slide into channel 11. Slide 22 and specifically forward end segment 22A may alternatively be deposited directly into channel 11 by downward movement into the channel during manipulation of the canopy by the installer(s). Subsequent lengthwise insertion of canopy attached slide 22 will eventually present flange end 28A for insertion into laterally projecting undercut portion 12 of sidewall affixed rail 10. Preferably, at such a point during canopy installation, a significant portion of canopy weight is borne by rails 10 each in place atop the truck box sidewalls.

Upon canopy removal, an insert at 40 in FIG. 11 may be installed in rail channel 11 and preferably is of a synthetic, colored material enhancing truck appearance. The insert locks later described tie down hooks in place in an extended, operable position and upon removal permits hook removal.

To facilitate installation of the canopy on rails 10 by one person, the forward end segment 22A of each slide 22 may be provided with rearwardly raked teeth at 37 while bracket 33, formed with forwardly raked teeth at 38, allows temporary, rested engagement of the canopy forward end on loading brackets 33 by the installer. The canopy may be moved forwardly along the inclined path represented by arrow 43 in FIG. 1 with tipping of the canopy and forward segments 22A of rails 22 downwardly into channels 11. Skids at 39 are provided per FIGS. 7 and 10 which are detachable from the canopy upon lifting of same. A canopy wall 24 seats between skid walls 38. A slide limit stop as at 41 is affixed to each slide 22 by fasteners 42 and abuts the rearward end of each rail 10.

With attention to FIGS. 12 and 13, tie down hooks at 50 are insertable at spaced apart intervals along rails 10 to receive a tie down rope R. For removably mounting of hooks 50 a rail 10 is provided with crosswise slots 51 in communication with channel 11. A slot 51 is defined partially by vertical walls 52 and by upwardly convergent walls 53 to slidably receive a tie down hook 50 having a head 54 with vertical side walls and a shank 55 a portion of the shank being provided with upwardly converging dovetail surfaces at 56 and an end cross member 57 with canted ends 57A to retain tie down rope R thereon. The hooks 50 along each rail 10 are locked in place by insert 40 or alternatively by a slide 22 of the canopy occupying rail channel 11. Upon insert or slide removal from channel 11, the hook 50 may be moved axially to locate head 54 of the hook into channel 11 and the dovetail shaped shank portion 56 into the channel and the slot wall defined area to permit upward removal of the hook from the rail.

While I have shown but a few embodiments of the invention, it will be apparent to those skilled in the art that the invention may be embodied still otherwise without departing from the spirit and scope of the invention.

Having thus described the invention, what is claimed and desired to be secured by Letters Patent is:

1. Rail structure for attaching a canopy to the side walls of a pickup truck box and comprising, rails each for securement along the upper extremities of the truck box walls, slides each for securement along the lower extremities of the canopy, locking means interlocking said slides to said rails, said rails each defining a channel with a laterally projecting undercut portion, and said slides each having a main body with a flangeless forward segment for downward placement into said channel and a rearward segment having a laterally directed flange thereon for lengthwise insertion into said undercut portion of the channel, said flange terminating at a point rearwardly offset from the forward end of said slide to facilitate initial engagement of said slides with said rails during installation of the canopy on the truck box side walls.

2. The rail structure claimed in claim 1 wherein said rails each includes a hold down member seated in corresponding forward ends of the rails and having an inclined surface, said slides each including hold down means having an inclined surface thereon insertably engageable with the first mentioned inclined surface.

3. The rail structure claimed in claim 1 additionally including canopy loading brackets, means detachably mounting each of said brackets to each of said rails, said brackets defining lengthwise grooves to support in a temporary manner the forward end segments of each of said slides during canopy installation.

4. The rail structure claimed in claim 3 wherein said loading brackets each include a first series of teeth, said slides each having a second series of teeth thereon for temporary rested engagement with the first series of teeth on each of said brackets during canopy installation.

5. The rail structure claimed in claim 1 additionally including ground engageable skids one each affixable to the rearward ends of the canopy side walls facilitating the positioning of the canopy over a ground surface during installation, said skids each having spaced apart walls between which a canopy side wall is insertable therebetween.

6. The rail structure claimed in claim 1 wherein said rails each define crosswise slots in communication with the channel in the rail and with a side of the rail, tie down hooks disposed in said slots and offset from said channel.

7. The rail structure claimed in claim 6 wherein said tie down hooks each include a shank slidably disposed in one of said slots, a head limiting movement of the hook crosswise of the rail in one direction, said hooks manually positionable within said slots into locked and unlocked positions.

8. The rail structure claimed in claim 7 wherein each of said slots is of a non-constant cross section, said shank being of non-constant cross section whereby the hook in the locked position is confined against displacement by rope applied forces and in an unlocked position may be lifted free of the rail when no tie down hook is desired.

9. The rail structure claimed in claim 1 wherein said locking means includes an eccentric cam pivotally mounted on said one of said rails for movement into the rail channel and into engagement with a slide in place in the rail channel to lock the slide against axial movement.

10. Rail structure for attaching a canopy to the side walls of a pickup truck box and comprising, rails each for securement along the upper extremities of the truck box walls, slides each for securement along the lower extremities of the canopy, support means attachable to said rails for temporary support of said slides and the canopy during installation of the canopy, locking means interlocking said slides to said rails, said rails each defining a channel with a laterally projecting undercut portion, and said slides each having a main body with a flangeless forward segment for downward placement into said channel and a rearward segment having a laterally directed flange thereon for lengthwise insertion into said undercut portion of the channel, said flange terminating at a point rearwardly offset from the forward end of said slide to facilitate initial engagement of said slides with said rails during installation of the canopy on the truck box side walls.

* * * * *